United States Patent

Miwa et al.

[11] Patent Number: 6,040,941
[45] Date of Patent: Mar. 21, 2000

[54] REFLECTION SCREEN AND METHOD FOR PRODUCING THE SAME

[75] Inventors: Minoru Miwa, Kakamigahara; Akiyoshi Takeno, Gifu; Toshihiro Koike, Urawa; Satoshi Ako, Asaka; Yasunori Sugiyama, Yono, all of Japan

[73] Assignee: Kimoto Co., Ltd., Japan

[21] Appl. No.: 08/892,398

[22] Filed: Jul. 15, 1997

[30] Foreign Application Priority Data

Jul. 19, 1996 [JP] Japan .................................. 8-208875

[51] Int. Cl.⁷ .......................... G03B 21/56; G02B 27/00; B29D 11/00
[52] U.S. Cl. .......................... 359/443; 359/449; 359/614; 264/1.9; 264/2.7
[58] Field of Search .............................. 428/913; 264/2.7, 264/1.9, 320; 359/452, 449, 454, 443, 599, 601, 614

[56] References Cited

U.S. PATENT DOCUMENTS

| | | | |
|---|---|---|---|
| 1,983,626 | 12/1934 | Lytle | 88/24 |
| 2,928,131 | 3/1960 | Mahler | 18/48 |
| 3,726,583 | 4/1973 | Fujisaki et al. | 350/126 |
| 4,566,756 | 1/1986 | Heijnemans | 350/126 |
| 4,984,871 | 1/1991 | Martinez | 350/117 |
| 5,361,163 | 11/1994 | Matsuda et al. | 359/452 |
| 5,675,437 | 10/1997 | Hart et al. | 359/566 |
| 5,760,955 | 6/1998 | Goldenberg et al. | 359/456 |
| 5,837,346 | 11/1998 | Langille et al. | 428/141 |

FOREIGN PATENT DOCUMENTS

| | | |
|---|---|---|
| 62-229122 | 10/1987 | Japan . |
| 6-82915 | 3/1994 | Japan . |
| 682607 | 3/1994 | Japan . |
| 7146403 | 6/1995 | Japan . |
| 7241917 | 9/1995 | Japan . |
| 7256676 | 10/1995 | Japan . |
| 885161 | 4/1996 | Japan . |

OTHER PUBLICATIONS

*Textbook of Polymer Science*, by Fred W. Bilmyer, Jr. (John Wiley and Sons 1966), pp. 164–171.

Primary Examiner—Safet Metjahic
Assistant Examiner—Christopher E. Mahoney
Attorney, Agent, or Firm—Lorusso & Loud

[57] ABSTRACT

A reflection screen includes a light-reflecting substrate laminated with a light-transmitting polymer layer having light absorptive crazes of regular directionality. The reflection screen is formed by coating or laminating the light-reflecting layer on the substrate, drawing over a blade in a direction perpendicular to the blade to form the crazes and inserting a light-absorbing material into the crazes. Images projected on the reflection screen have high contrast and can be observed as sharp images even in a lighted area such as in a room lighted by fluorescent lighting.

16 Claims, 3 Drawing Sheets

F I G. 5
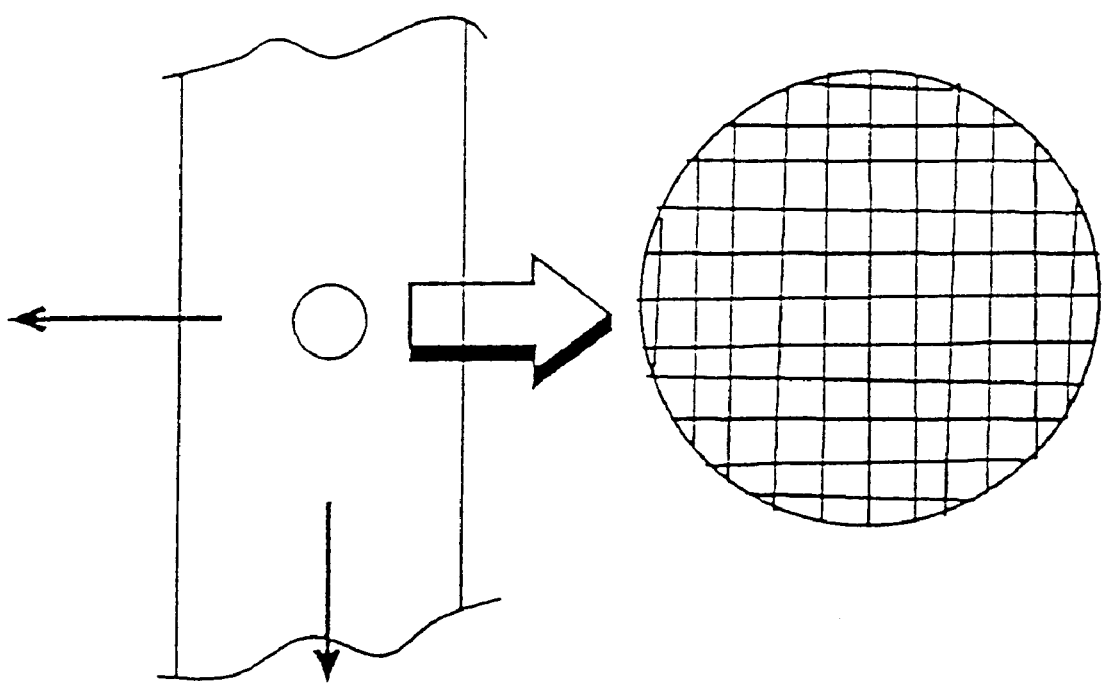

REFLECTION SCREEN AND METHOD FOR PRODUCING THE SAME

BACKGROUND OF THE INVENTION

The present invention relates to a reflection screen for image projection which can be easily produced and exhibits high contrast of projected images, and a method for producing it. The images projected on the reflection screen are easy to view even in a lighted place.

Reflection screens having reflecting property for reflecting light from projectors and light diffusing property for diffusing the reflected light are used as projection screens for OHPs, slide projectors, film projectors and the like.

The most commonly used reflection screens are those comprising a black lining sheet laminated with a white polyvinyl chloride sheet as a light-reflecting substrate. Also used are reflection screens comprising a light-reflecting substrate applied with a white ink containing a pearl pigment or aluminum paste pigment and optionally surface roughened to have fine projections and depressions and thus improve its reflectance.

However, these reflection screens are produced with no consideration to improving the contrast ratio of dark image portions in black and bright image portions in white. Their use is therefore limited to dark places such as a dark room. Attempts have therefore been made to develop reflection screens which improve the contrast of projected images so that clear images can be seen even in a space where ceiling lights and/or natural light from windows may be present. See, for example, Japanese Patent Unexamined Application Publication Nos. Sho 62-229122 and Hei 6-82915.

Japanese Patent Unexamined Application Publication No. Sho 62-229122 discloses a projection screen comprising a transparent plate covering a diffusion surface for diffusing projected light. The transparent plate has numerous small surface portions provided with opaque layers so that the opaque layers do not cut the light paths of diffused light directed to the observer.

Japanese Patent Unexamined Application Publication No. Hei 6-82915 discloses a reflection screen comprising a screen substrate, a reflection layer provided on the substrate and composed of applied white ink and light-absorbing layers composed of light-absorbing ink applied by, for example, printing on the reflection layer surface at numerous portions.

The light-absorbing ink is an ink having a light-absorbing peak wavelength of around 575 nm and showing reddish black hue.

However, the production of the reflection screen according to Japanese Patent Unexamined Application Publication No. Sho 62-229122 requires a molding operation to provide the numerous small surfaces on the transparent plate. In addition, it is extremely troublesome to form opaque layers only in the small surfaces not present on the light paths of diffused light directed to the observer. Therefore, when a large reflection screen is produced by this technique, it disadvantageously leads to low productivity and high cost.

Further, according to Japanese Patent Unexamined Application Publication No. Hei 6-82915, the specific light-absorbing ink is defined so as not to absorb the projected light of bright images in white, thereby improving the contrast. However, since the light-absorbing layer does not have sufficient thickness to adequately absorb ambient light, for example, indoor illumination light, dark images in black are also brightened in a lighted environment. On the other hand, it is possible to make the dark images sharp by increasing the area of the light-absorbing layers, but this in turn makes the bright images in white become grayish. Thus, sharp images with high contrast still cannot be obtained.

Accordingly, the object of the present invention is to solve the above problems, i.e., to provide a reflection screen for image projection which can be produced easily at low cost, show good contrast of projected images and hence make projected images sufficiently visible even in a lighted space, and a method for producing it.

SUMMARY OF THE INVENTION

As a first aspect of the present invention, there is provided a reflection screen for image projection comprising a light-reflecting substrate laminated with a light-transmitting polymer layer having light absorptive cracks called crazes of regular directionality.

In one embodiment of the reflection screen according to the present invention, the light-transmitting polymer layer is a non-oriented polymer layer.

In another embodiment of the reflection screen according to the present invention, the light-transmitting polymer layer is an oriented polymer layer.

In another embodiment of the reflection screen according to the present invention, the crazes are regularly formed along two or more directions in terms of the length direction of the crazes.

As a second aspect of the present invention, there is provided a method for producing the above reflection screen of the present invention, which method comprises laminating the light-transmitting polymer layer on the light-reflecting substrate, linearly applying a force on the light-transmitting polymer layer in regular directionality, the force being sufficient for forming crazes in the layer, to form numerous crazes of regular directionality in the light-transmitting polymer layer and introducing a light-absorbing substance into the formed crazes.

In the above method of the present invention, the lamination of the light-transmitting polymer layer on the light-reflecting substrate may be performed before or after forming the crazes or introducing a light-absorbing substance into the crazes.

In an embodiment of the above method of the present invention, the light-transmitting polymer layer is laminated on the light-reflecting substrate by coating.

In another embodiment of the above method of the present invention, a light-transmitting polymer film, which may be an oriented or non-oriented polymer film, is laminated on the light-reflecting substrate as the light-transmitting polymer layer.

BRIEF DESCRIPTION OF DRAWINGS

FIG. 5 illustrates a structure of one embodiment of the reflection screen of the present invention.

DETAILED DESCRIPTION OF THE INVENTION

Figure 1:
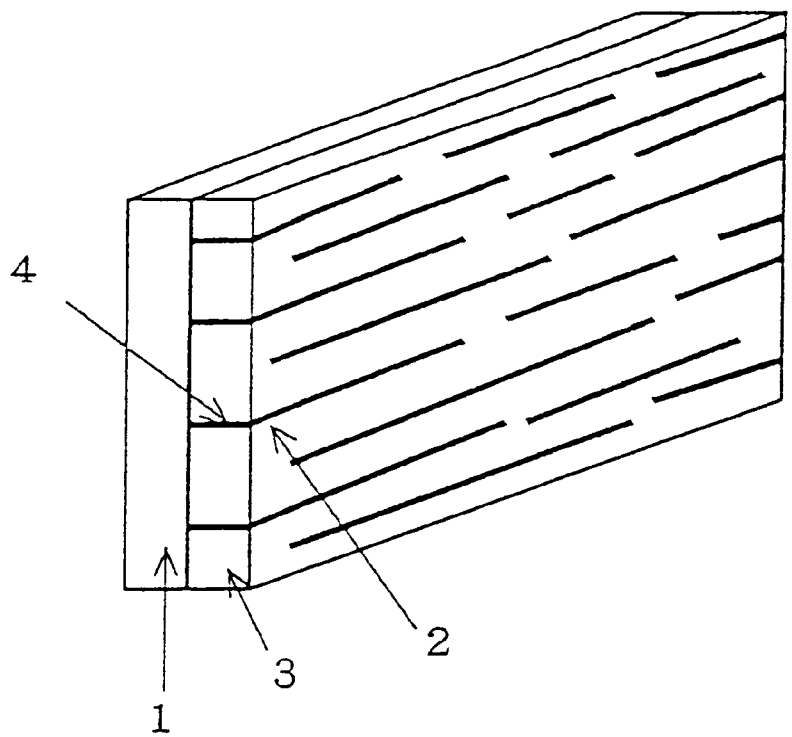
FIG. 1 shows a schematic view of one embodiment of the reflection screen of the present invention.

As shown in FIG. 1, the reflection screen of the present invention is characterized in that it comprises a light-reflecting substrate 1, a light-transmitting polymer layer 3 having crazes 2 of regular directionality which is laminated on the light-reflecting substrate 1 and a light-absorbing substance 4 contained in the crazes.

The term "regular directionality" used herein means that the crazes are formed in parallel along the length and the depth directions of the crazes.

Figure 2:
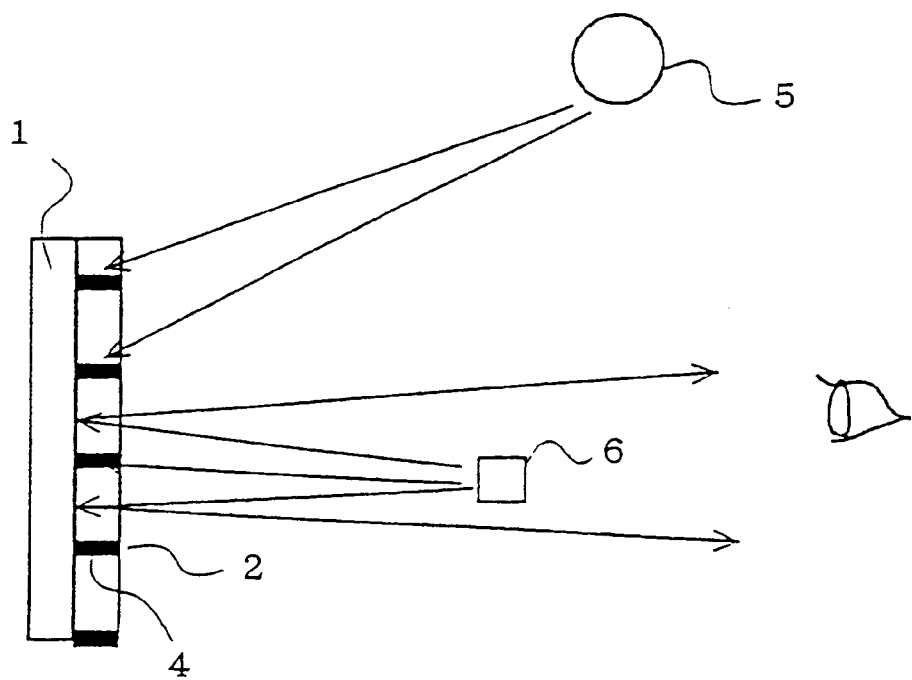
FIG. 2 illustrates the function of the reflection screen of the present invention.

As shown in FIG. 2, when the reflection screen of the present invention is used in a space where a room light 5 is present, light from the room light 5 is absorbed by the light-absorbing substance 4 contained in the crazes 2 and light from a projector 6 is reflected by the light-reflecting substrate 1. Thus, images with high contrast can be observed as if the projection were performed in a dark room.

Figure 3:
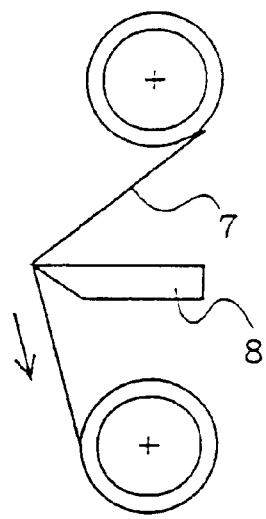
FIG. 3 illustrates an embodiment of the method for producing the reflection screen of the present invention.
Figure 4:
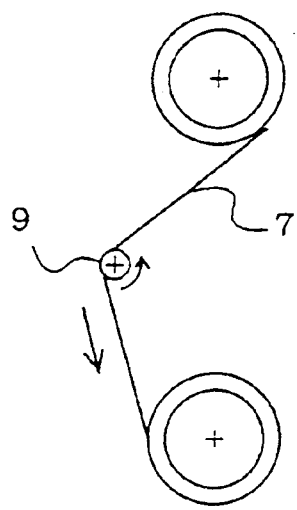
FIG. 4 illustrates another embodiment of the method for producing the reflection screen of the present invention.

As shown in FIGS. 3 and 4, the crazes of the reflection screen of the present invention can be easily formed by bending a layer or film 7 on which the crazes to be formed while the layer or the like is drawn along the direction perpendicular to the bending direction under tension. Therefore, the reflection screen of the present invention is suitable for continuous production and can be easily produced at low cost.

The term "film" used herein encompasses both films and "sheets".

The light-reflecting substrate used for the present invention is not particularly limited so long as it has a light-reflecting surface. Examples of the light-reflecting substrate include white polyester films and white polyvinyl chloride films, which have light-reflecting property because of contained pigments, their porous structure or the like. Examples of the light-reflecting substrate further include those films having a light-reflecting surface layer formed by coating, vaporization, sand blasting, solvent treatment, any combination of two or more of three treatments or the like. The coating solution used for the coating may be, for example, a resin solution containing a dispersed pigment such as titanium oxide, zinc oxide, silica or the like or a resin solution containing a foaming agent.

The light-transmitting polymer layer of the present invention is constituted of a light-transmitting polymer material. The polymer material may be any of various thermoplastic, thermosetting, UV-ray-curing or other such polymer materials enabling crazes to be formed therein. Examples of the polymer material include styrene resins such as polystyrenes, styrene/acrylonitrile copolymers, acrylonitrile/butadiene/styrene copolymers and styrene/butadiene copolymers, other thermoplastic resins such as polymethyl methacrylates, polyvinyl chlorides, polyvinylidene fluorides and cellulose nitrates, thermosetting resins such as epoxy resins, phenolic resins and unsaturated polyesters, various ultra-violet-ray-curing resins and the like. Two or more of these resins may be used in combination or they may be mixed with other resins. Among these, polystyrenes and polymethyl mathacrylates are particularly preferred.

The light-transmitting polymer layer may be either a non-oriented polymer layer or oriented polymer layer. The term "oriented" used herein means that the film used for the light-transmitting polymer layer is a film whose polymer molecules have been intentionally oriented by, for example, stretching during production. The term "non-oriented" used herein means that the film used for the light-transmitting polymer layer is not a film whose polymer molecules have been intentionally oriented.

The method for producing the reflection screen of the present invention is characterized in that the crazes are formed in the light-transmitting polymer layer by linearly applying a force sufficient for forming crazes in the layer, for example, by bending the layer, in regular directionality and introducing a light-absorbing substance into the crazes. The light-transmitting polymer layer may be laminated on the substrate before or after the crazes are formed or a light-absorbing substance is introduced into the crazes.

The light-transmitting polymer layer is laminated on the light-reflecting substrate, for example, by applying the light-transmitting polymer on the light-reflecting substrate by coating or melt extrusion, or by co-extruding the two layers.

To form the light-transmitting polymer layer by coating, a coating solution containing a polymer material for the light-transmitting polymer layer dissolved in an appropriate solvent can be applied by a wire bar or the like and dried to leave a coated layer. To form the light-transmitting polymer layer by melt extrusion, a polymer material for the light-transmitting polymer layer melted by heating can be extruded from a die onto the light-reflecting substrate. To form the light-reflecting substrate and the light-transmitting polymer layer by co-extrusion, a material for the light-reflecting substrate prepared by, for example, kneading a pigment such as titanium oxide with a resin such as a polyester resin and a polymer material for the light-transmitting polymer layer can be co-extruded from a die and drawn to form laminated layers. When the coating technique is used, a surfactant for improving coating property of the coating solution, an antistatic agent such as a quaternary ammonium salt for imparting antistatic property to the light-transmitting polymer layer and the like may be added to the coating solution.

Alternatively, to laminate the light-transmitting polymer layer on the light-reflecting substrate, a light-transmitting polymer layer in the form of a preliminarily formed film may be attached to the light-reflecting substrate by, for example, adhering with adhesive, by heat sealing or the like. In this case, the film may be laminated on the light-reflecting substrate before or after the crazes are formed in the film. When a film having crazes is laminated, the film may be laminated on the light-reflecting substrate before or after a light-absorbing substance is introduced into the crazes.

In one embodiment of the method of the present invention, the reflection screen of the present invention can be produced by, as disclosed in Japanese Patent Unexamined Application Publication No. Hei 6-82607, bending an oriented light-transmitting polymer film along a direction approximately parallel to the direction of the molecular orientation to form a locally bent region, drawing the film along a direction perpendicular to the bending direction to form numerous crazes approximately parallel to the molecular orientation in the film, introducing a light-absorbing substance into the crazes and laminating the film having the crazes to the light-reflecting substrate. Also in this case, a light-absorbing substance may be introduced into the crazes before or after the film is laminated to the light reflecting substrate.

The method for forming crazes in a film will be specifically explained hereinafter with reference to the appended drawings.

In the method of the present invention, as shown in FIG. 3 for example, a film 7 on which crazes are to be formed is drawn under tension while the edge of a blade 8 is pressed onto the film so that the film is properly creased, or, as shown in FIG. 4, the film 7 is drawn while a bend 9 is formed on the film, to continuously apply a force sufficient for forming crazes in the film. In both cases, a film having crazes in the direction perpendicular to the drawing direction can be obtained. In FIGS. 3 and 4, the downward arrows indicate the drawing direction.

A reflection screen having crazes along two or more directions can be obtained by repeating the above procedure for two or more directions as shown in FIG. 5.

Then, a light-absorbing substance is introduced into the crazes formed as described above. The light-absorbing substance may be, for example, a dye or pigment, which preferably exhibits absorbance over the whole visible light range. A black pigment or dye such as carbon black or aniline black is particularly preferred. Alternatively, colored portions can be formed in the crazes by utilizing polymerization of pyrroles.

The light-absorbing substance can be introduced into the crazes by dissolving or dispersing it in a solvent and immersing the film having the crazes into the solution or dispersion. The solution or dispersion may further contain a resin material.

Though the film having crazes may be immersed into the solution or dispersion as it is, the solution or dispersion can be more efficiently introduced into the crazes by slightly bending the film so that openings of the crazes are expanded.

Though the thickness of the light-transmitting polymer layer is not particularly limited, it is desirably 100 μm or less so that good operability of the craze forming operation can be obtained. The bending angle for forming crazes is decided based on the thickness and kind of the material of the film.

In forming crazes, the temperature of the atmosphere in which the crazes are formed is also important. This is because, even when the same material for the light-transmitting polymer layer is used, crazes may or may not be formed depending on the operating temperature when the sheet is bent. Therefore, the atmosphere temperature affects the production process and hence the properties of the products.

For example, a polymer material producing crazes at ambient temperature is very beneficial from the point of productivity because the production process can be carried out at ambient temperature. However, a reflection screen made of such a material is likely to undergo formation of new crazes when the screen is bent during later handling and use. Accordingly, to obviate such a problem, it is necessary to laminate the layer on a substrate of a suitably hard material such as a relatively rigid plastic, or to mount the screen on a rigid object.

On the other hand, a polymer material producing crazes only at a low temperature of, for example, 0° C. or less is disadvantageous from the point of productivity because a low-temperature atmosphere is required for the craze forming process. However, the reflection screen made of such a material does not form unnecessary crazes at ordinary temperature even when it is bent along a direction different from the direction of the crazes.

Further, the crazes may disappear with time. A material for the light-transmitting polymer material having such property may be advantageous, because required crazes can be colored before they disappear and unnecessary crazes formed thereafter disappear with time, thus stably providing the advantages of the reflection screen of the present invention.

Therefore, considering these factors, a polymer material suitable for the intended purpose should be selected and a skilled person will be able to easily select a polymer material suitable for the intended purpose.

The reflection screen of the present invention may further comprise, between the light-reflecting substrate and the light-transmitting polymer layer, an adhesive layer for improving adhesion of the layers, an antistatic layer for imparting antistatic property or the like.

Further, the reflection screen of the present invention may have light-scattering property on either surface of the light-transmitting polymer layer or the light-reflecting substrate depending on the purpose. Various kinds of anti-reflection treatments of the light-transmitting polymer layer surface may be often useful.

EXAMPLES

The present invention will be further explained with reference to the following examples, but the scope of the present invention is not limited thereto.

Example 1

A polystyrene resin (666R: Asahi Chemical Industry Co., Ltd.) was dissolved in a mixed solvent of methyl ethyl ketone and toluene, applied to a foamed white polyester film having a thickness of 75 μm with a wire bar and dried by heating to form a light-transmitting polymer layer having a thickness of 30 μm.

Then, the obtained laminate was drawn while a Teflon blade having a blade angle of 50° was pressed onto the polyester film side of the laminate to form numerous crazes in the polystyrene layer (light-transmitting polymer layer).

The formed crazes of the laminate were colored black by immersing the laminate into the following black coloration solution to give a reflection screen of the present invention.

<Composition of Black Coloration Solution>

| | |
|---|---|
| Acrylic acid/methyl methacrylate/ 2-hydroxyethy methacrylate copolymer (copolymerization molar ratio = 1/4/5) | 5 parts by weight |
| Carbon black (MA-100, Mitsubishi Chemical Corp.) | 5 parts by weight |
| Aqueous ammonia (reagent grade) | 3 parts by weight |
| Water | 77 parts by weight |
| Isopropyl alcohol | 10 parts by weight |

When images were projected on the obtained reflection screen by an overheadprojector in a roomlighted byfluorescent lighting, images with higher contrast than those obtainable on ordinary white screens were obtained.

Example 2

One surface of a polyester film having a thickness of 75 μm was subjected to matting treatment by sand blasting and coated with aluminum by vaporization to give a light-reflecting substrate.

A coating solution containing polymethyl methacrylate resin (Paraloyd A-11: Rohm & Haas) dissolved in a mixed solvent of methyl ethyl ketone and toluene was applied to the aluminum coated surface of the substrate with a wire bar and dried by heating to form a light-transmitting polymer layer having a thickness of 30 μm.

Then, the obtained laminate was drawn while a bend was formed in the laminate with a roller having a diameter of 5 mm to form numerous crazes in the polymethyl methacrylate layer (light-transmitting polymer layer) . The crazes formed in the laminate were colored black in a manner similar to that of Example 1 to give a reflection screen of the present invention.

When images were projected on the obtained reflection screen by an overhead projector in a room lighted by fluorescent lighting, images with higher contrast than those obtainable on ordinary white screens were obtained.

Example 3

A polystyrene resin (666R, Asahi Chemical Industry Co., Ltd.) was melt-extruded on a foamed white polyester film having a thickness of 75 μm to form a polystyrene layer having a thickness of 30 μm. Then, the obtained laminate was drawn while a Teflon blade having a blade angle of 50° was pressed onto the polyester film side of the laminate to form numerous crazes in the light-transmitting polymer layer and the crazes formed in the laminate were colored black by immersing the laminate into a black coloration solution in a manner similar to that of Example 1 to give a reflection screen of the present invention.

When images were projected on the obtained reflection screen by an overheadprojector in a roomlightedby fluorescent lighting, images with higher contrast than those obtainable on ordinary white screens were obtained.

Example 4

A polystyrene coated layer was formed on a white polyester filmasinExamplel. The obtainedlaminatewas drawn while a Teflon blade having a blade angle of 50° was pressed onto the polyester film side of the laminate to form numerous crazes in the light-transmitting polymer layer. Then, the above operation was repeated using a bending direction perpendicular to the above first bending direction to form crazes along two directions.

The crazes of the laminate were colored black in a manner similar to that of Example 1 to give a reflection screen of the present invention.

When images were projected on the obtained reflection screen by an overhead projector in a room lighted by fluorescent lighting, images with even higher contrast than those obtained on the screen of Example 1 were obtained.

Example 5

An acrylonitrile/styrene copolymer (Lytac 100PC, Mitsui Toatsu Chemicals Inc.) and a high density polyethylene (6100A, Tosoh Corp.) kneaded with titanium oxide (FA50, Furukawa Co., Ltd.) were co-extruded from a die while the extruded laminate was drawn to an extent that did not cause the copolymers to be oriented. A laminate whose layers each had a thickness of 50 μm was obtained.

This sheet was continuously bent with a blade in a manner similar to that of Example 1 to form numerous crazes in the acrylonitrile/styrene copolymer layer. The crazes of the laminate were colored black in a manner similar to that of Example 1 to give a reflection screen of the present invention.

When images were projected on the obtained reflection screen by an overhead projector in a room lighted by fluorescent lighting, images with higher contrast than those obtainable on ordinary white screens were obtained.

Example 6

A commercially available light-transmitting polymer film of polyvinylidene fluoride (PVDF) was continuously bent with a blade in a direction approximately parallel to the direction of molecular orientation as in Example 1.

The crazes of the film were colored black by immersing the film into the following black coloration solution and the film was adhered to a white polyester film having a thickness of 100 μm to give a reflection screen of the present invention.

<Composition of Black Coloration Solution>

| | |
|---|---|
| Black dye (Dianix Black HSL-FS250, Mitsubishi Chemical Corp.) | 1 g |
| Water | 30 ml |
| Isopropyl alcohol | 10 ml |
| Methyl ethyl ketone | 10 ml |

When images were projected on the obtained reflection screen by an overhead projector in a room lighted by fluorescent lighting as in Example 5, images with higher contrast than those obtainable on ordinary white screens were obtained.

As explained above, according to the present invention, a reflection screen, even one in a large size, can easily be obtained at low cost.

Images projected on the reflection screen of the present invention have high contrast and can be observed as sharp images in a lighted space such as in a room lighted by fluorescent lighting. The reflection screen of the present invention is useful as a screen for OHPs, slide projectors, film projectors and the like.

What is claimed is:

1. A reflection screen for image projection comprising a light-reflecting substrate and, adhered to one surface of said substrate, a light-transmitting polymer layer having light absorptive crazes of regular directionality, said light absorptive crazes containing a light absorptive dye or pigment.

2. The reflection screen of claim 1, wherein the light-transmitting polymer layer consists of a non-oriented light-transmitting polymer layer.

3. The reflection screen of claim 1, wherein the light-transmitting polymer layer consists of an oriented light-transmitting polymer film.

4. The reflection screen of claim 1, wherein the crazes are regularly formed along two or more directions.

5. The reflection screen of claim 1 wherein said light-reflecting substrate is white.

6. A method for producing a reflection screen comprising a light-reflecting substrate and, adhered to one surface of said substrate, a light transmitting polymer layer having light absorptive crazes of regular directionality, which method comprises:

linearly applying a force on the light-transmitting polymer layer with regular directionality, the force being sufficient for forming crazes in the layer, to form numerous crazes of regular directionality in the light transmitting polymer layers and introducing a light-absorbing substance into the formed crazes.

7. The method of claim 6 which further comprises forming the light transmitting polymer layer on the light-reflecting substrate by coating.

8. The method of claim 6 wherein said light-absorbing substance is a dye or pigment.

9. A method for producing a reflection screen comprising a light-reflecting substrate laminated with a light-transmitting polymer layer having light absorptive crazes of regular directionality, which method comprises linearly applying a force on a light-transmitting polymer film in regular directionality, the force being sufficient for forming crazes in the film, to form numerous crazes of regular directionality in the light-transmitting polymer film, introducing a light-absorbing substance into the formed crazes and then laminating the film to the light-reflecting substrate as the light-transmitting polymer layer.

10. The method of claim 9, which comprises bending a light-transmitting oriented polymer film along a direction approximately parallel to molecular orientation of the film to form a locally bent region, drawing the film along a direction perpendicular to the bending direction to form numerous crazes of regular directionality in the light-transmitting polymer film, introducing a light-absorbing substance into the formed crazes and then laminating the film to the light-reflecting substrate as the light-transmitting polymer layer.

11. The method of claim 9 wherein said light-absorbing substance is a dye or pigment.

12. A method for producing a reflection screen comprising a light-reflecting substrate laminated with a light transmitting polymer layer having light-absorbing crazes of regular directionality, which method comprises linearly applying a force on a light-transmitting polymer film in regular directionality, the force being sufficient for forming crazes in the film, to form numerous crazes of regular directionality in the light-transmitting polymer film, laminating the film to the light-reflecting substrate as the light-transmitting polymer layer and then introducing a light-absorbing substance into the formed crazes.

13. The method of claim 12, which comprises bending a light-transmitting oriented polymer film along a direction approximately parallel to the molecular orientation of the film to form a locally bent region, drawing the film along a direction perpendicular to the bending direction to form numerous crazes of regular directionality in the light-transmitting polymer film, laminating the film to the light-reflecting substrate as the light-transmitting polymer layer and then introducing a light-absorbing substance into the formed crazes.

14. A reflection screen for image projection comprising a light-reflecting substrate and, adhered to one surface of said substrate, a light-transmitting polymer layer having light absorptive crazes of regular directionality, said reflection screen produced by the method comprising:

forming the light-transmitting polymer layer on the light-reflecting substrate to produce a composite;

drawing the composite across a blade in a direction perpendicular to the blade to form numerous crazes of regular directionality in the light-transmitting polymwr layer; and introducing a light-absorbing substance into the formed crazes.

15. The reflection screen of claim 14 wherein said light-reflecting substrate is white.

16. The reflection screen of claim 14 wherein said crazes contain a light absorptive dye or pigment.

* * * * *